United States Patent
Tonnelier

(10) Patent No.: US 11,615,258 B2
(45) Date of Patent: Mar. 28, 2023

(54) DUAL INPUT CONTENT PROCESSING METHOD AND DEVICE

(71) Applicant: MOBILEAD, Paris (FR)

(72) Inventor: Laurent Tonnelier, Paris (FR)

(73) Assignee: MOBILEAD, Paris (FR)

(*) Notice: Subject to any disclaimer, the term of this patent is extended or adjusted under 35 U.S.C. 154(b) by 0 days.

(21) Appl. No.: 15/656,074

(22) Filed: Jul. 21, 2017

(65) Prior Publication Data
US 2018/0025195 A1    Jan. 25, 2018

(30) Foreign Application Priority Data
Jul. 25, 2016    (EP) .................................... 16305954

(51) Int. Cl.
*G06K 7/14*    (2006.01)
*G06F 16/955*    (2019.01)

(52) U.S. Cl.
CPC ....... *G06K 7/1417* (2013.01); *G06F 16/9554* (2019.01); *G06K 7/14* (2013.01); *G06K 7/1443* (2013.01); *G06K 7/1456* (2013.01)

(58) Field of Classification Search
CPC ....... G06K 7/1417; G06K 7/14; G06K 7/1443
See application file for complete search history.

(56) References Cited

U.S. PATENT DOCUMENTS

| | | | |
|---|---|---|---|
| 5,726,435 A | 3/1998 | Hara et al. | |
| 8,579,196 B1 | 11/2013 | Lowe | |
| 11,436,303 B1 * | 9/2022 | Calagaz | ................. G06V 40/10 |

(Continued)

FOREIGN PATENT DOCUMENTS

| | | |
|---|---|---|
| CN | 1666237 A | 9/2005 |
| CN | 101681484 A | 3/2010 |

(Continued)

OTHER PUBLICATIONS

European Search Report for 16305954.6 dated Mar. 29, 2017.
(Continued)

*Primary Examiner* — Dhairya A Patel
(74) *Attorney, Agent, or Firm* — Meagher Emanuel Laks Goldberg & Liao, LLP

(57) ABSTRACT

A content code is defined containing user content, and a corresponding profile code defining user context information. The profile code may be scanned and stored temporarily in a user device or elsewhere. The user content can then be modified on the basis of the stored context information. In some cases the context code and profile code may be separate, so that a given profile code may be applied to diverse pieces of content, or may be combined. The stored context information may be undated or modified when particular events, such as re-scanning a code, occur. The codes may comprise binary codes, such that the profile code and the content code can be compared by a logical operation. Embodiments include a mechanism for presenting different notice information to different users on the basis of their profile codes, implementing a game such that the number of attempts are counted by refreshing the stored version of the profile code, and identifying cases where a list of ingredients stored in the context codes matches an ingredient corresponding to an allergy, intolerance or the like as specified in the profile code.

8 Claims, 7 Drawing Sheets

(56) References Cited

U.S. PATENT DOCUMENTS

| | | | |
|---|---|---|---|
| 2005/0119946 A1* | 6/2005 | Cakiral | G06Q 30/0629 705/26.64 |
| 2005/0289247 A1 | 12/2005 | Simons et al. | |
| 2008/0305815 A1 | 12/2008 | McDonough | |
| 2008/0308630 A1* | 12/2008 | Bhogal | G07G 1/009 235/383 |
| 2009/0265381 A1* | 10/2009 | Canu | G16H 10/65 |
| 2010/0225450 A1* | 9/2010 | Fischer | A61F 4/00 715/709 |
| 2011/0113068 A1* | 5/2011 | Ouyang | H04L 67/306 709/217 |
| 2011/0137960 A1 | 6/2011 | Price et al. | |
| 2013/0073583 A1 | 3/2013 | Licata et al. | |
| 2013/0325567 A1* | 12/2013 | Bradley | G06Q 30/02 705/14.1 |
| 2014/0045472 A1* | 2/2014 | Sharma | H04L 12/1818 455/416 |
| 2014/0246334 A1* | 9/2014 | Bosch | G06K 9/00496 204/406 |
| 2015/0161249 A1 | 6/2015 | Knox et al. | |
| 2015/0356306 A1* | 12/2015 | Carter | G06F 21/64 380/246 |
| 2015/0358163 A1* | 12/2015 | Carter | G06F 21/645 713/179 |
| 2016/0019305 A1 | 1/2016 | Hariharan et al. | |
| 2016/0027042 A1* | 1/2016 | Heeter | G06Q 30/0248 705/14.47 |
| 2017/0024945 A1* | 1/2017 | Shalev | G07C 9/27 |
| 2021/0209322 A1* | 7/2021 | Whalen | G06Q 10/20 |
| 2021/0238976 A1* | 8/2021 | Avasarala | E21B 47/003 |
| 2021/0243185 A1* | 8/2021 | Thasale | G06K 7/1413 |
| 2021/0247134 A1* | 8/2021 | Gray | H04L 12/2816 |

FOREIGN PATENT DOCUMENTS

| | | |
|---|---|---|
| CN | 102640480 A | 8/2012 |
| CN | 103814376 A | 5/2014 |
| CN | 104679812 A | 6/2015 |
| CN | 104699732 A | 6/2015 |
| WO | 2013112520 A1 | 8/2013 |

OTHER PUBLICATIONS

Third Office Action for corresponding Chinese Application No. 201710610833.3, dated Jun. 8, 2021.

English Translation of Chinese 4th Office Action for corresponding Chinese Application No. 201710610833.3, dated Nov. 5, 2021.

Yang, Tiejun et al., Industry Patent Analysis Report No. 31 High Memory, Beijing: Intellectual Property Publishing House, pp. 646-653, Jun. 30, 2015.

Yang Tianxiang et al., Network Finance 2nd Edition, Shanghai: Fudan University Press, pp. 101-105, Jan. 31, 2015.

Peng Li, Introduction to Internet of Things Technology, the 12th Five-Year Plan textbooks for ordinary universities, pp. 196-201, Aug. 31, 2015.

* cited by examiner

DUAL INPUT CONTENT PROCESSING METHOD AND DEVICE

FIELD OF THE INVENTION

The present invention relates to the processing and output of content.

BACKGROUND OF THE INVENTION

Logistics as a field inherently attracts information technology solutions, and as internet technology has developed through the twentieth century a number of different mechanisms for making a connection between an object and an electronic information handling system have been developed. Punched cards were developed as the original input means for computing devices, and the possibility of using similar cards was quickly identified as a rapid means of registering the sale of an object. A major development in this field came with the development of the Universal Product Code system, based on the reading of a two dimensional barcode with a laser scanner. On the basis of this and related technologies, virtually all packaged consumer goods today are provided with such a code. More recently, matrix, or two dimensional bar codes, such as "QR Codes" (registered trade mark in some jurisdictions) described as example in US patent referenced U.S. Pat. No. 5,726,435 have become common. Such codes are able to encode more information in a small area than conventional one dimensional bar codes, and as such are frequently used to encode a Uniform Resource Indicator. Meanwhile, in addition to these optical solutions, radio based tagging solutions such as those based on RFID tags are increasingly widespread.

One use of such codes is as a repository of information, which may be read and decoded by a user device, and presented to the user. While it is most common for the content of the code to contain a URI pointing to the repository which may then be accessed via the internet or other network(s), examples of storing information directly in the code are known.

FIG. 1 shows an arrangement as known in the prior art.

As shown in FIG. 1, a QR code 101 is printed on a poster 100. The poster 100 is affixed in a specified location. The QR code is unique, and incorporates encoded information describing the specified location. In this prior art, the location is a particular part of a particular railway carriage. A special application running on a user device 110 is adapted to read the QR code, decode the information in it, and display the decoded information. In particular, at a first stage the application prompts a user to scan a QR code such as 101, as shown in the display representation 111, and at a second stage, after reading the QR code 101, the application displays the decoded information as shown in the display representation 112.

This approach overcomes a drawback in the usual approach of incorporating a URI in the QR code, which is then only operant when a network connection is available. In the railway implementation of FIG. 1, network access cannot be relied upon, hence the particular desirability of this approach in this application. On the other hand, the information in the QR codes is inherently static.

It is thus desirable to define a mechanism for providing information locally in a dynamic manner.

SUMMARY OF THE INVENTION

In a first aspect, there is provided a code processing device comprising a profile code reader, adapted to read a profile code, defining a content operation. The device is further adapted to create a persistent record with a predefined lifetime reflecting the profile code and it is adapted to read a content code defining output material, and to recover the content operation from the persistent record, and apply the content operation to the output material to obtain modified content material, and to output the modified content material. The temporary device-side storage of profile information helps preserve user privacy, while the storage of complete information in the content code provides an information source, which is network independent, but still susceptible to user customization, using the profile information.

In a second aspect there is provided a method of creating a dynamic data output at a user location, comprising the steps of:

reading a profile code local to the user, where the profile code defines a content operation;

creating a persistent record with a predefined lifetime reflecting the profile code;

reading a content code local to the user where the content code defines output material;

recovering the content operation from the persistent record, applying the content operation to the output material to obtain modified content material, and outputting the modified content material. The temporary device-side storage of profile information helps preserve user privacy, while the storage of complete information in the content code provides an information source which is network independent but still susceptible to user customization using the profile information.

In a development of the second aspect, the step of reading a profile code or the step of reading a content code comprises scanning an optical code. Optical codes are very inexpensive to produce and can be read by generic imaging devices together with suitable software, and as such are readable by a vast range of user devices, including smart phones, tablets and the like.

In a development of the second aspect the step of reading a profile code or the step of reading a content code comprises interrogating an RFID tag. RFID tags can store substantial quantities of information, and do not require line of sight to the user device.

In a further development of the second aspect, the persistent record is a cookie, and the method comprises retrieving the persistent record from a remote server.

In a further development of the second aspect, the persistent record is an entry in a database local to the user. In this context, local to the user may be interpreted as meaning that the database is stored in the user device used to scan the codes, or in a device connected as a peripheral to that used to scan the codes, or in a device to which that used to scan the codes is connected as a peripheral.

In a further development of the second aspect, the persistent record is an entry in a remote database, and the method comprises an additional step of consulting this remote database to retrieve the persistent record.

In a further development of the second aspect, the method comprises an additional step of modifying the content of the persistent record after the step of recovering the content of the persistent record. Modifying the persistent record provides a mechanism for managing long user sessions, in particular where the behavior of the system is required to evolve over time, or with repeated interactions.

In a further development of the second aspect, the profile code or the content code includes a threshold time, and the method proceeds to the step of applying the content operation if the threshold time is later than the current time.

In a further development of the second aspect, the persistent record is encrypted.

In a third aspect, there is provided a set of machine readable codes comprising a machine readable content code defining output material and a machine readable profile code defining a content operation applicable to the output material, whereby application of the content operation to the output material defines modified content material.

In a fourth aspect, there is provided a machine readable content code defining output material according to a predefined structure, said content code being characterized in that application of a content operation defined in a machine readable profile code of corresponding structure defines modified content material.

In a fifth aspect, there is provided a machine readable profile code defining a content operation according to a predefined structure, said machine readable profile code being characterized in that application of the content operation to a machine readable content code defining output material in accordance with a corresponding predefined structure defines modified content material.

In a development of the third, fourth or fifth aspect, the predefined structure comprises a predefined number of character sets of predefined length, in a predetermined order, each character set being selected from a predefined list and associated with predefined content material.

In accordance with a sixth aspect, there is provided a computer program adapted to implement the steps of the second aspect.

In accordance with a seventh aspect, there is provided a device adapted to implement the steps of the second aspect.

BRIEF DESCRIPTION OF THE DRAWINGS

The above and other advantages of the present invention will now be described with reference to the accompanying drawings, for illustration purposes, in which.

DETAILED DESCRIPTION

Figure 1:
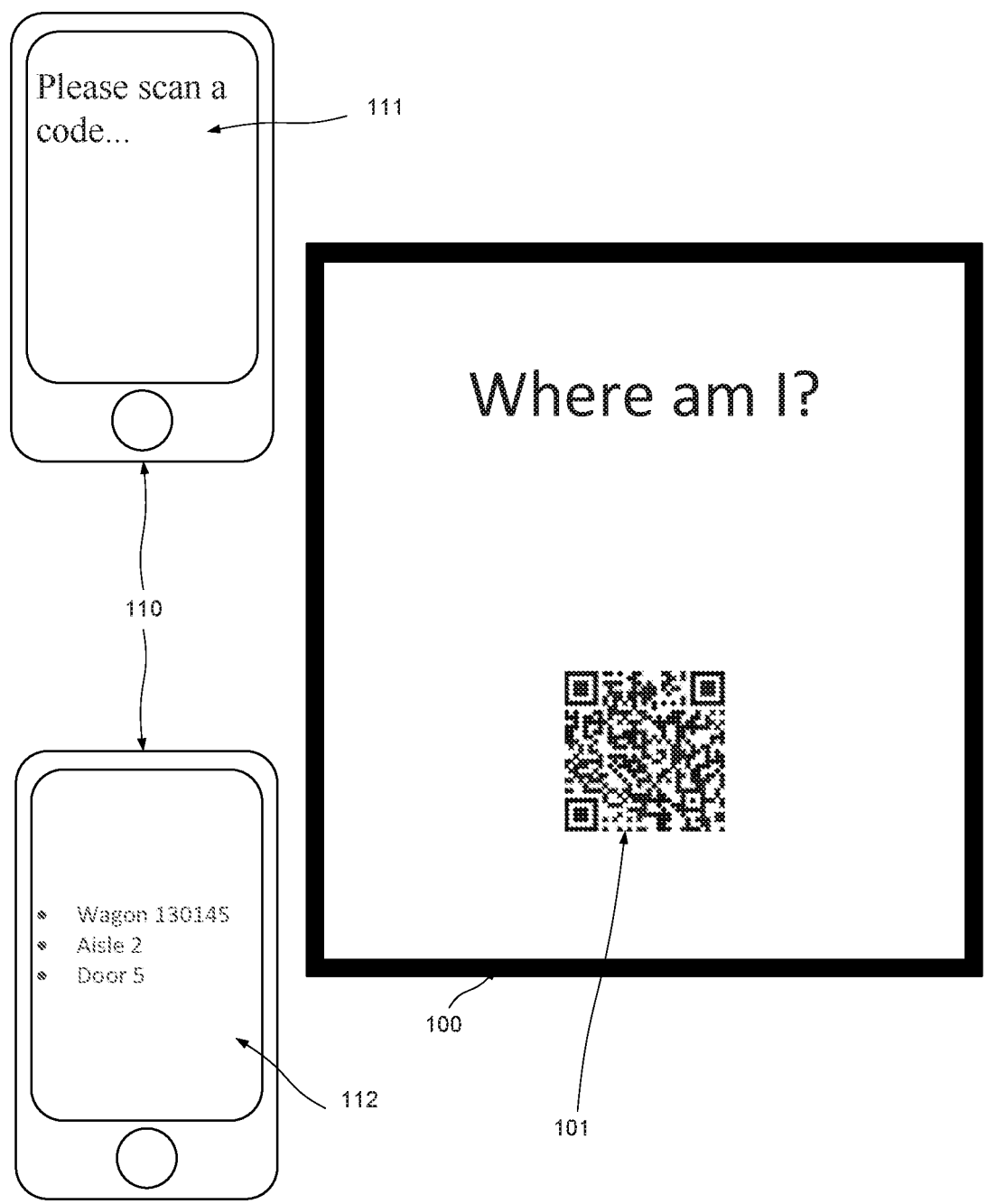
FIG. 1 shows an arrangement as known in the prior art.
Figure 2:
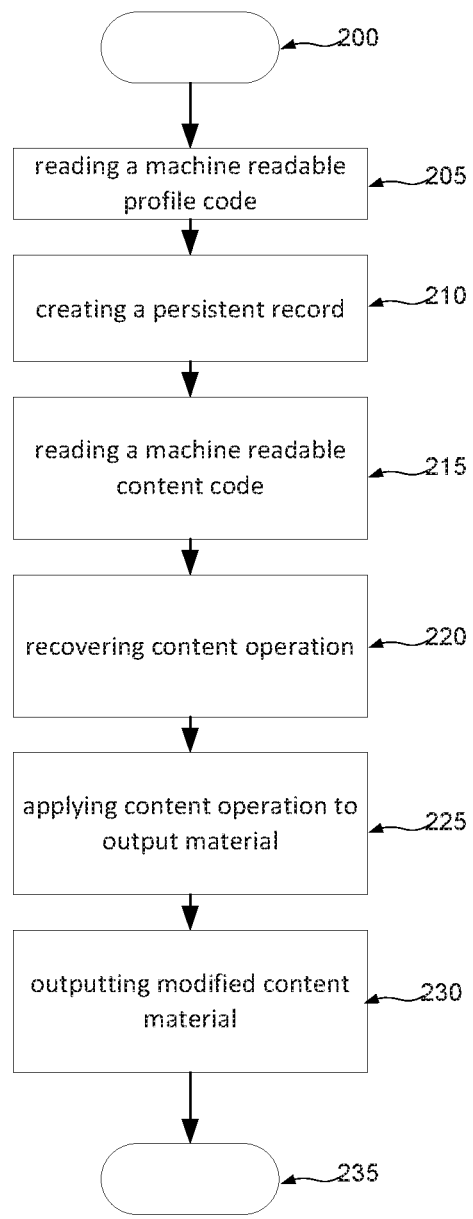
FIG. 2 shows a method in accordance with an embodiment.

FIG. 2 shows a method in accordance with an embodiment.

The method of FIG. 2 constitutes a method of creating a dynamic data output at a user location. As shown, the method starts at step 200, before proceeding to step 205 at which a profile code local to the user is read.

The code may take any form. By way of example:

it may be optically readable, for instance in the form of an image, an alphanumeric code, or a one, two (including "QR" codes) or three dimensional bar code, or a holographic code. The code may be disposed together with other visual content, for example by steganography. Optical reading, by way of a camera, laser scanner etc, has a security advantage over radio communications in that it requires a line of sight and specified alignment with the object, making covert reading of the object difficult. Consumer devices are very frequently provided with a camera device, meaning that such readers can be implemented without addition of dedicated special hardware.

It may be magnetically readable, for example in the form of a magnetic strip.

It may be readable by radio communication, for example by RFID, NFC or Bluetooth Low Energy systems.

Radio communications have the advantage of not requiring physical contact, or even line of sight between the object and a reader. Short range radio communication enhances the security and avoid by construction man in the middle attacks. Short range radio communications are increasingly used in consumer devices, meaning that such readers can be implemented without special hardware.

It may be readable acoustically, or as a sound wave emitted by the object, either continuously, periodically or in response to stimulation by a user or generated by the user device implementing the invention. This stimulation may be mechanical, sonic, electronic, optical or by any other suitable mechanism.

Although sound waves do not require physical contact, or even line of sight between the object and a reader, they are subject to diffusion and interference inherently limiting the range at which they can be used. As such, in some implementations sound waves can offer a compromise between the characteristics of optical and radio reading. Consumer devices are often provided with microphone (and loudspeaker), meaning that such readers (respectively sound emitter) can be implemented without special hardware.

It may be readable as a tactile or palpable code, for example in the form of punched indentations or bumps, which may be read by optical or mechanical means.

As such, the step of reading a profile code may comprise scanning an optical code, interrogating an RFID tag, or whatever other reading operation may correspond to the machine readable encoding method employed as per the preceding examples or otherwise.

The profile code read at step 205 defines a content operation. A content operation defines a mechanism, rule, filter or parameter which may be used in later processing of content, for example as further discussed below. Once the profile code has been read, the method proceeds to step 210, at which a persistent record with a predefined lifetime is created, reflecting the profile code.

In certain variants, the persistent record may be a cookie, in which case the method may additionally comprise a step of retrieving the persistent record from a remote server.

In certain variants, the persistent record may be an entry in a database local to the user, and the step of creating a persistent record may involve creating or updating records in such a database. In this context, local to the user may be interpreted as meaning that the database is stored in the user device used to scan the codes, or in a device connected as a peripheral to that used to scan the codes, or in a device to which that used to scan the codes is connected as a peripheral.

In certain variants, the persistent record may be an entry in a remote database, and the step of creating a persistent record may involve creating or updating records in such a database.

The method next proceeds to step 215 at which a content code local to the user is read. The content code may comprise any of the machine readable code types mentioned above with regard to the profile code, or otherwise. The encoding used for the profile code may be the same as that used for the content code, or different types of encoding may be used.

Indeed, in certain implementations, it is anticipated that many different content codes and many different profile codes may be defined as discussed below, and within a given implementation any given profile code or content code may be encoded by any of the possible encoding mechanisms.

The content code defines output material. This output material may generally be some content that is to be provided in some form to the user, as illustrated by a number of examples below.

The method next proceeds to step 220, at which the content operation is recovered from the persistent record. This may imply reading a locally stored cookie or other file, retrieving data from a local or remote database, or otherwise, depending on the storage mechanism adopted for the implementation of step 210.

Once the content operation is retrieved, it is applied at step 215 to the output material defined in the content code, to obtain modified content material.

The modified content material is then output at step 230. The outputting may simply involve presenting the modified content material on a user display, possibly after some additional editing in view of display constraints such as screen or window size, resolution, colour depth or the like, or editing or manipulation in view of local settings and parameters such a preferred language, font size, information type prioritization and the like.

By this means, the content specified in the content code can be adapted to meet any requirements specified in the profile code, thereby providing a mechanism for presenting information locally in a dynamic manner.

It will be appreciated that the steps of FIG. 2 need not necessarily be performed in the order shown. For example, in some embodiments the profile code and content code may be scanned simultaneously, and indeed as discussed below may even constitute one single code.

Figure 3:
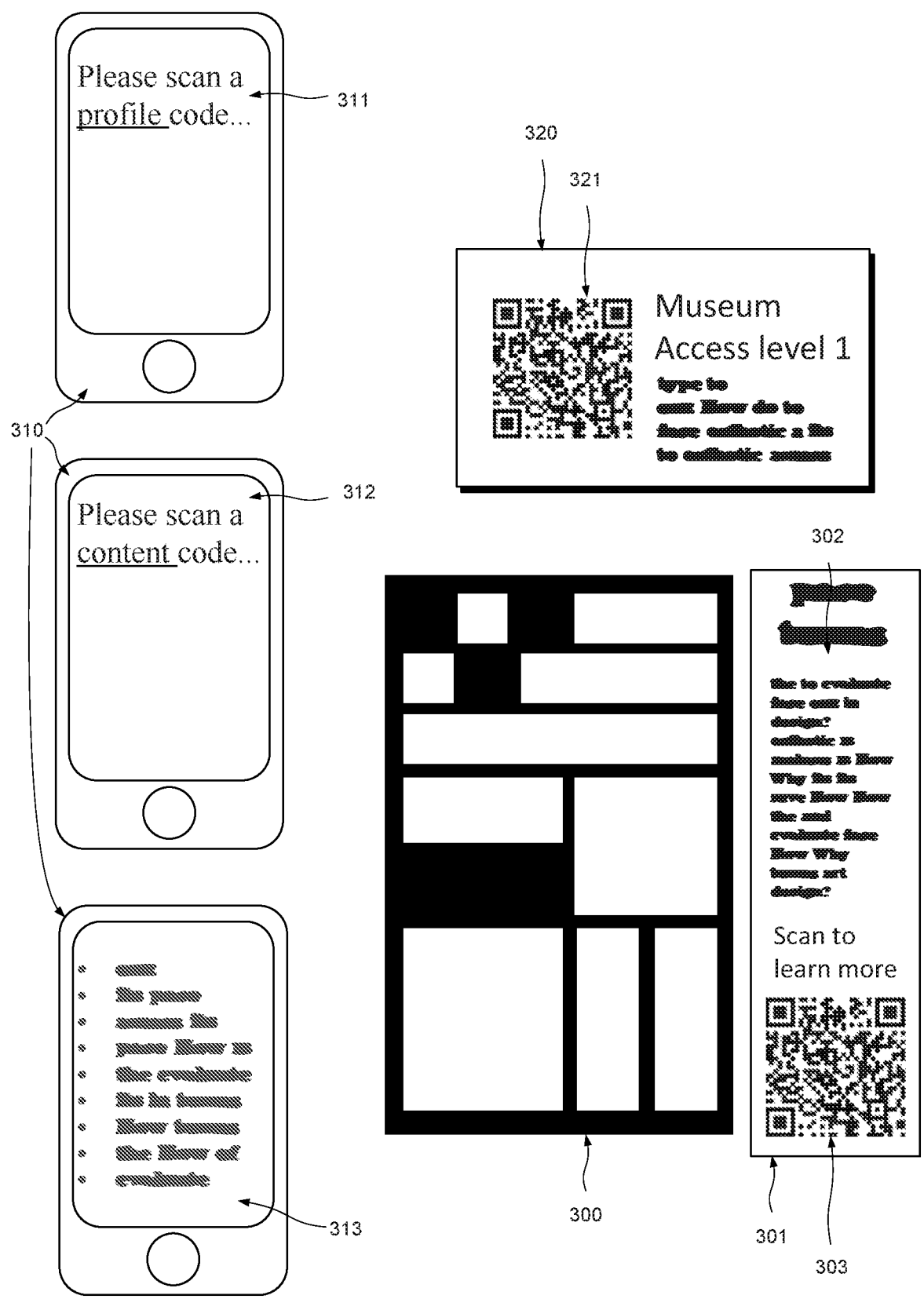
FIG. 3 shows a first implementation in accordance with the method of FIG. 2.

FIG. 3 shows a first implementation in accordance with the method of FIG. 2.

This implementation is presented by way of example in the context of informational displays in a museum. It is common to present explanatory texts associated with respective articles on display for the benefit of visitors. In the present implementation, an embodiment provides a mechanism for enriching such displays.

As shown, an informational display 301 is associated with an article 300. This display may include some text 302 (deliberately obscured in the drawing), and a context code 303. In this example, the content code may repeat the text 302, or provide additional detail, alternative representations, additional language texts, and so on.

Furthermore, as shown there is provided an entrance ticket 320, bearing a profile code 321.

As shown, a user device 310 initially prompts the user to scan a profile code in display representation 311. In accordance with the method of FIG. 2, the user scans the profile code 321 on his entrance ticket 321. He may perform this action once, on entering the museum, or from time to time, for example on entering a new room, or with a specified frequency. Each time the profile code is scanned, a persistent record of its content is created, and the duration of this persistent record will correspond to whatever scanning frequency model is intended. If the intention is that the user should scan once for his entire visit, the persistent record lifetime may be set to 24 hours, or whatever the expected duration of the visit is expected to be. This may be set dynamically on the basis of the time of scanning, and other factors such as the remaining time until the museum closes the same day.

The profile code may additionally contain information specific to the user. For example, it may reflect his preferred language, his age bracket, his interest in or level of knowledge of particular categories of object on display, and so on.

As shown, a user device 310 later prompts the user to scan a content code in display representation 312. In accordance with the method of FIG. 2, the user scans a content code. In the context of the present example, a different content code may be provided for each article on display, a group of articles, a room, and so on. The user may scan any such content code.

In accordance with the method of FIG. 2, the content of the QR code is recovered, and a content operation defined by the profile code implemented. For example, the descriptive information in non-preferred languages may be discarded, and the remaining information filtered to correspond to the user's age bracket, level of interest and knowledge of the category of articles to which the article described belongs.

Accordingly, the content finally displayed in display representation 313 will correspond specifically to the user's needs.

In a case where the profile code has expired, either no content may be displayed, or an alternative subset such as a message that closing time is approaching, or the entirety of the content.

As well as defining a lifetime for the persistent record, the profile code or the content code may include a threshold time. In such variants, the step of applying the content operation may be carried out differently, or not at all, if the threshold time is earlier than the current time, i.e. the threshold time has passed. This provides a mechanism for handling content on the basis of absolute time values, rather than the relative mechanism reflected by the lifetime of the persistent record.

In the context of the present example, the mechanism may be used to reflect the museum's closing time, the time of scheduled demonstrations, and so on.

Figure 4:
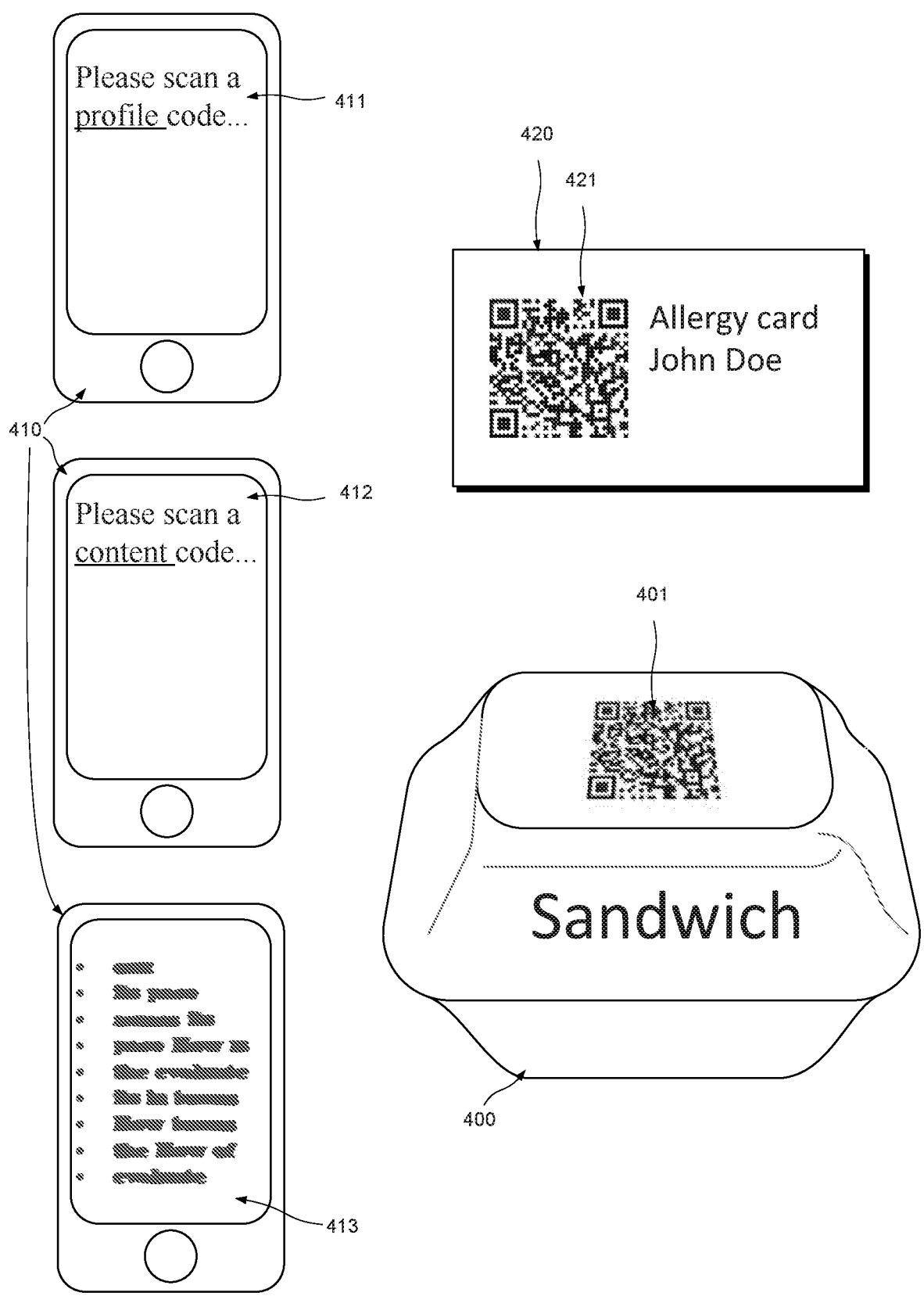
FIG. 4 shows a second implementation in accordance with the method of FIG. 2.

FIG. 4 shows a second implementation in accordance with the method of FIG. 2.

This implementation is presented by way of example in the context of allergy information on food packaging. In many jurisdictions, it is a requirement to present minimum information concerning the presence of certain allergens in food products.

For example, the following are common allergens.
1. Cereals containing gluten,
2. Crustaceans and products thereof
3. Eggs and products thereof
4. Fish and products thereof
5. Peanuts and products thereof
6. Soybeans and products thereof
7. Milk and products thereof (including lactose)
8. Tree nuts and products thereof
9. Celery and products thereof
10. Mustard and products thereof
11. Sesame seeds and products thereof
12. Sulphur dioxide and sulphites
13. Lupin and products thereof
14. Molluscs and products thereof Food manufactures must also comply with requirements as to the general presentation of the ingredients of their products, as well as highlighting the presence of any allergens such as mentioned above. These also need to be presented in the respective languages of any market in which the product may be sold. This often leads to very dense blocks of small print, which can be very difficult to read, increasing the probability that a consumer fails to notice the presence of an allergen of concern to himself, or dismisses the product out of hand rather than attempt to evaluate its content.

The present invention provides a solution to these difficulties.

As shown, a food container 400 is provided with a context code 401. In this example the context code may include a complete list of ingredients of the food product (not shown) in the container, or merely a list of allergens. In either case, the list may be present in a plurality of languages.

Furthermore, as shown there is provided an allergy card 420, bearing a profile code 421. This profile code specifies each of the ingredients to which the user holding the card has an allergy.

As shown, a user device 410 initially prompts the user to scan a profile code in display representation 411. In accordance with the method of FIG. 2, the user scans the profile code 421 on his allergy card 421. He may perform this action once. Each time the profile code is scanned, a persistent record of its content is created, and the duration of this persistent record will correspond to whatever scanning frequency model is intended.

In this embodiment, assigning a finite lifetime to the persistent record implements privacy by design— sensitive information belonging to the user is only present in the user device for a limited period, and as such potential exposure to identity theft or other unauthorized attempts to obtain a user's private information are inherently blocked.

As shown, a user device 410 later prompts the user to scan a content code in display representation 412. In accordance with the method of FIG. 2, the user scans a content code. In the context of the present example, a different content code may be provided for on food packaging, or in some cases on the food item itself, or on a notice or price label near or otherwise associated with the food item. The user may scan any such content code.

In accordance with the method of FIG. 2, the content of the code (as example a QR code) is recovered, and a content operation defined by the profile code implemented. For example, the descriptive information in non-preferred languages may be discarded, and the remaining information filtered to present only listed ingredients with respect to which the user has some allergy or intolerance. This processing may proceed still further, with an indication of whether the user may safely proceed to purchase or consume the food product, or not.

In some embodiments, the content code may contain an explicit list of items, and the profile code a similar explicit list.

For example in the context of the embodiment of FIG. 2, the content code might contain the data "eggs and products thereof, Soybeans and products thereof, Milk and products thereof (including lactose), Tree nuts and products thereof, Mustard and products thereof, Sesame seeds and products thereof, Lupin and products thereof", indicating that these allergens may be present in the product. Similarly, the profile code may contain the data "Soybeans and products thereof", indicating that the user associated with this profile has an allergy to soybeans and products thereof. The two codes can be compared, and any common material presented to the user. This approach has the advantage of requiring no contextual awareness in the application implementing the comparison.

In some embodiments, the content code may contain an explicit, structured list of items, and the profile code a correspondingly structured set of indicator values.

For example in the context of the embodiment of FIG. 2, the content code might contain the data ",,eggs and products thereof,,, Soybeans and products thereof,, Milk and products thereof (including lactose), Tree nuts and products thereof,, Mustard and products thereof, Sesame seeds and products thereof,, Lupin and products thereof,", indicating that these allergens may be present in the product. Note that this list is in a comma separated variable format, and that where one of the fourteen allergens is not present, the corresponding position in the list is empty, but still defined by bounding commas. Similarly, the profile code may contain the data ",,,,,,1,,,,,,,,", indicating that the user associated with this profile has an allergy to the item in the sixth position in the list, i.e. soybeans and products thereof. In this approach, once the profile code is read, the application can determine whether anything is present in the slot specified by the profile code, and any data found presented to the user. This approach has the advantage of only knowledge of the structure of the two codes, whilst leaving open the possibility of different texts being used in the content list. This might provide support for different languages being used, or variations in wording providing more nuanced information such as "traces of Soybeans may be present". This approach also means that minimal information is immediately visible in the profile code—the structure and context of the encoding must be known in order to interpret its content, which will tend to further support the privacy objectives of the present invention.

In some embodiments, the profile code may contain a structured list of indicator values, and the content code a correspondingly structured set of explicit values.

For example in the context of the embodiment of FIG. 2, the content code might contain the data ",,,1,,,1,1,1,,1,1,, 1,,,", indicating that the product contains eggs and products thereof, Soybeans and products thereof, Milk and products thereof (including lactose), Tree nuts and products thereof, Mustard and products thereof, Sesame seeds and products thereof, Lupin and products thereof. Note that these lists are in a comma separated variable format, and that where one of the fourteen allergens is not present, or not of concern (as the case may be), the corresponding position in the list is empty, but still defined by bounding commas. Equivalently, the structured code might take the form of a binary sequence, 00100111011010, with a 1 indicating the present of a particular allergen, and a 0 indicating its absence. Similarly, the profile code may contain the data "Soybeans and products thereof", indicating that the user associated with this profile has an allergy to soybeans and products thereof. The two codes can be compared, and where the content code includes an indicator value in the position corresponding to an item specified in the profile code, the user may be informed accordingly.

In some embodiments, the profile code may contain a structured list of indicator values, and the content code a correspondingly structured set of indicator values.

For example in the context of the embodiment of FIG. 2, the profile code might contain the data ",,,1,,,1,1,1,,1,1,,1,,", indicating that the product contains eggs and products thereof, Soybeans and products thereof, Milk and products thereof (including lactose), Tree nuts and products thereof, Mustard and products thereof, Sesame seeds and products thereof, Lupin and products thereof. Note that this list is in a comma separated variable format, and that where one of the fourteen allergens is not present, the corresponding position in the list is empty, but still defined by bounding commas. Equivalently, the structured code might take the form of a binary sequence, 00100111011010, with a 1 indicating the present of a particular allergen, and a 0 indicating its absence. Similarly, the profile code may contain the data 00000100000000, indicating that the user associated with this profile has an allergy to soybeans and products thereof. The two codes can be compared, and where the content code includes an indicator value in the position corresponding to an item specified in the profile code, the user may be informed accordingly. In embodiments where the structured lists are defined by a numerical code such as the binary codes described above, the comparison may be carried out by mathematical or logical operations, simplifying and accelerating the process.

Where a numerical value such as a binary sequence is used to encode content or profile information as described above, this value may be treated as a string, which may be parsed to identify regular expressions, or may be processed a numerical value. A binary sequence processed as a numerical value may be encoded in any number base such as decimal, hexadecimal, base 64 and so on.

For example:

101000000001 in Binary gives "2561" in Decimal and "oB" in Radix 64

000101000101 in Binary gives "325" in Decimal and "FF" in Radix 64

When values are compared, this may then be performed as a mathematical operation on the respective values.

Accordingly, there may be provided a set of codes comprising a content code defining output material and a profile code defining a content operation applicable to said output material, whereby application of said content operation to said output material defines modified content material.

Similarly, there may be provided a content code defining output material according to a predefined structure, said content code being characterized in that application of a content operation defined in a profile code of corresponding structure defines modified content material.

Similarly, there may be provided a profile code defining a content operation according to a predefined structure, characterized in that application of the content operation to a content code defining output material in accordance with a corresponding predefined structure defines modified content material.

In each of these codes, the predefined structure may comprises a predefined number of characters sets of predefined length, in a predetermined order, each characters set being selected from a predefined list and associated with predefined content material.

Still further, each said characters set may comprise either a 0 or a 1, in which case comparison may be performed by a logical operation such as a bitwise Logical AND or the like.

Accordingly, the content finally displayed in display representation 313 will correspond specifically to the user's needs.

It will be appreciated that while the user interactions with the device 410 have been described in terms of text displayed on a screen, these prompts and outputs may equally be performed by means of audible messages for example by synthesized or recorded speech, or other sounds as may be appropriate to the context (for hands free operation for example).

In a case where the profile code has expired, either no content may be displayed or an alternative subset, or the entirety of the content.

If no profile code has been scanned, the entirety of the content may still be read and displayed, without any content operation.

Since the information in the profile code may be potentially sensitive, the profile code, and/or the persistent record may be encrypted, in which case additional steps of decoding the profile code and/or persistent record are provided.

While the embodiment of FIG. 4 has been described in the context of a simple scenario with 14 allergens, it will be appreciated that the same approach is applicable in many more complex situations. For example it may be used with product quality labels, consumer preferences such as vegan, vegetarian, Kosher or Halal, and may extend to other food allergies, food intolerances and food hypersensitivities. The product owner (brand owner or product manufacturer for example) or the end user may be able to cause the sequence of display of each element to be determined in accordance with their own preferences. Different consumer age brackets have differing characteristic allergy frequencies, so that display order or prominence may be automatically determined on the basis of age or other user characteristics as read from the profile code or otherwise. The classification of different ingredients may be more or less granular, and may have a hierarchical structure, so as to better reflect real allergy scenarios. For example, salmon is a fish, but salmon is not a white fish such as cod fish, so that a hierarchical classification with "fish" comprising "white fish" and "non-white fish" categories may provide a richer and more helpful database. Similarly, wheat contains gluten but some people are allergic to wheat not gluten, so that a more granular database distinguishing between different gluten sources would add greater value.

Figure 5:
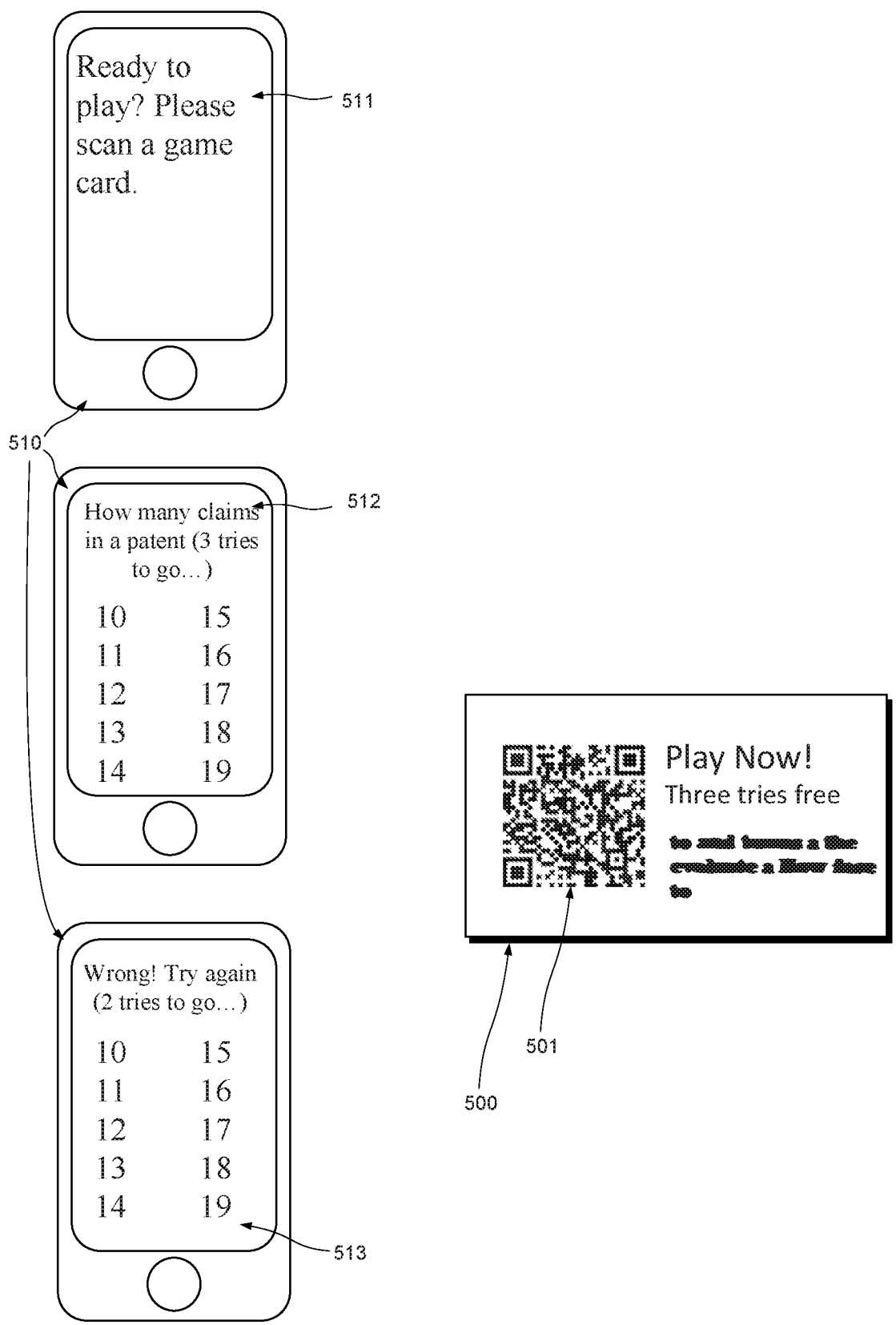
FIG. 5 shows a third implementation in accordance with the method of FIG. 2.

FIG. 5 shows a third implementation in accordance with the method of FIG. 2.

This implementation is presented by way of example in the context of a "scratch card" type completion. It is well known for lottery games and quizzes to be implemented by means of cards, with certain regions obscured by a temporary opaque layer. The outcome of the game is determined, or becomes apparent, once a user removes the temporary layer over some or all of these regions in a manner dictated by the rules of the game.

Printing and distributing these cards represents an overhead to the organization of such games, and the present invention provides a mechanism for vitalizing some or all such game features.

As shown, a game card 500 is provided with a code 501. In this example, code 501 constitutes both the profile code and the context code as will become clear from the following description. The code includes competition information—any arbitrary rule set may be implemented. For the sake of the present example, the following rules are assumed to be defined in the code: the player is allowed three attempts per day to guess the average age of a claims in a European patent application. Ten possible answers are proposed, and the proper response is specified.

As shown, a user device 510 initially prompts the user to scan the code in display representation 511. In accordance with the method of FIG. 2, the user scans the code 501 on his game card 500.

The first time the code is scanned, a persistent record of its content is created, with a duration of one day, as required by the game rules. This persistent record contains a game identifier, and a count value indicating the number of time the game has been attempted. The content of the game rules is also read, and a representation corresponding to the content defined in the code, as subjected to the content operation specified for the first attempt is output as shown in display representation 512.

The second time the code is scanned within the 24 hours period, the same information is read from the code, and no new persistent record is created since a persistent record corresponding to the game identifier already exists. However, the count value in the existing persistent record is incremented, and a representation corresponding to the content defined in the code, as subjected to the content operation specified for the second attempt is output as shown in display representation 513.

The code may be scanned many times, but once the number of attempts specified in the games rules is exceeded, the game may refuse to process further attempts. It will of course be possible to resume once the persistent record expires after 24 hours, whereupon a new persistent record may be created.

Additional security measures may be desirable in applications with financial implications or other tangible rewards.

Accordingly, there is provided an additional step of modifying the content of the persistent record after the step of recovering the content of said persistent record.

The three implementations described with respect to FIGS. 3, 4 and 5 have been selected to present particular features in a coherent manner. It will be appreciated that countless other such implementations exist, and that the various features of any of the described implementations may be combined in any arbitrary manner. For example, the absolute time threshold of the implementation of FIG. 3, the encryption feature of the implementation of FIG. 4, or the iteration counting feature of the implementation of FIG. 5, or any other features described above, or otherwise, may be combined indifferently in any implementation.

While the embodiment of FIG. 2 takes the form of a sequence of method steps, many other embodiments may be envisaged. For example, in accordance with another embodiment, there is provided a set of codes comprising a content code defining output material as described above or otherwise, and a profile code defining a content operation applicable to the output material as described above or otherwise, whereby application of the content operation to the output material defines modified content material as described above or otherwise.

Accordingly, a content code is defined containing user content, and a corresponding profile code defining user context information. The profile code may be scanned and stored temporarily in a user device or elsewhere. The user content can then be modified on the basis of the stored context information. In some cases, the context code and profile code may be separate, so that a given profile code may be applied to diverse pieces of content, or may be combined. The stored context information may be undated or modified when particular event(s), such as re-scanning a code, occur(s). The codes may comprise binary codes, such that the profile code and the content code can be compared by a logical operation. Embodiments include a mechanism for presenting different notice information to different users on the basis of their profile codes, implementing a game such that the number of attempts are counted by refreshing the stored version of the profile code, and identifying cases where a list of ingredients stored in the context codes matches an ingredient corresponding to an allergy, intolerance or the like, as specified in the profile code.

Embodiments can take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or part by a user device. These methods and processes may be implemented by computer-application programs or services, an application-programming interface (API), a library, and/or other computer-program product, or any combination of such entities.

The user device may be a mobile device such as a smart phone or tablet, a computer or any other device with processing capability, such as a robot or other connected device.

In particular, there is thus provided a code processing device comprising a profile code reader, the device being adapted to read a profile code, where the profile code defines a content operation; to create a persistent record with a predefined lifetime reflecting said profile code; and to read a content code where said content code defines output material; to recover said content operation from said persistent record, apply said content operation to said output material to obtain modified content material, and to output said modified content material.

Figure 6:
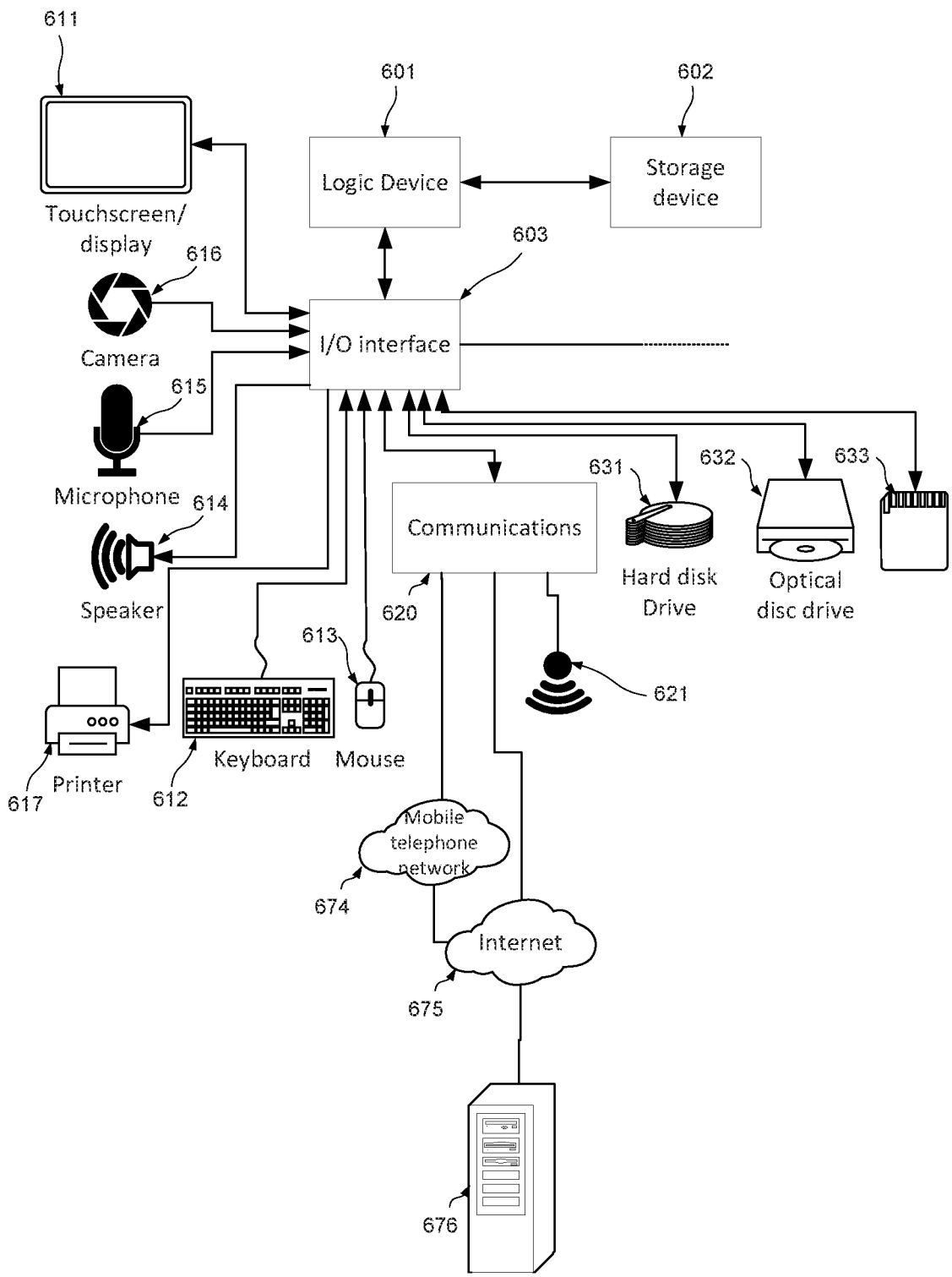
FIG. 6 shows a generic computing system suitable for implementation of embodiments of the invention.

FIG. 6 shows a generic computing system suitable for implementation of embodiments of the invention.

A shown in FIG. 6, a system includes a logic device 601 and a storage device 602. The system may optionally include a display subsystem 611, input/output subsystem 603, communication subsystem 620, and/or other components not shown. Logic device 601 includes one or more physical devices configured to execute instructions. For example, the logic device 601 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 601 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 601 optionally may be distributed among two or more separate devices, which may be remotely located and/or configured for coordinated processing. Aspects of the logic device 601 may be virtualized and executed by remotely accessible, networked computing devices configured in a cloud-computing configuration.

Storage device 602 includes one or more physical devices configured to hold instructions executable by the logic device to implement the methods and processes described herein. When such methods and processes are implemented, the state of storage 602 device may be transformed e.g., to hold different data.

Storage device 602 may include removable and/or built-in devices. Storage device 602 may comprise one or more types of storage device including optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device may include volatile, nonvolatile, dynamic, static, read/write, read-only, random-access, sequential-access, location-addressable, file-addressable, and/or content-addressable devices.

In certain arrangements, the system may comprise an interface 603 adapted to support communications between the Logic device 601 and further system components. For example, additional system components may comprise removable and/or built-in extended storage devices. Extended storage devices may comprise one or more types of storage device including optical memory 632 (e.g., CD, DVD, HD-DVD, Blu-Ray Disc, etc.), semiconductor memory 633 (e.g., RAM, EPROM, EEPROM, FLASH etc.), and/or magnetic memory 631 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 601 and storage device 602 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 6 may be used to implement embodiments of the invention.

For example a program implementing the steps described with respect to FIG. 2 may be stored in storage device 602 and executed by logic device 601. The persistent record may be stored in storage device 602 or the extended storage devices 632, 633 or 631. The Logic device may cause the camera 616 or Near Field interface 621 to read the profile code and/or content code, or otherwise cause the printer 617 or Near Field interface 621 to impose the object identifier and/or the code.

Similarly a program implementing the steps described with respect to FIG. 5 or 6 may be stored in storage device 602 and executed by logic device 601. The record may be stored in storage device 602 or the extended storage devices 632, 633 or 631. The logic device may cause the camera 616 or Near Field interface 621 to read the code from the object to obtain the content code or profile code. The Logic device may then decode the content code and/or profile code, and filter the content code on the basis of the profile code as described above, and so on.

Accordingly the invention may be embodied in the form of a computer program.

Furthermore, when suitably configured and connected, the elements of FIG. 6 may constitute a system for defining a profile code for a particular content context. Such a system may be adapted to combine user parameters and context parameter from a memory (such as 602, 631, 632, 633) and define a machine readable representation of a profile code reflecting these values for use in defining a content operation for application to a content structure with regard to the profile code.

Furthermore, when suitably configured and connected, the elements of FIG. 6 may constitute a system for defining a context code for a particular content context. Such a system may be adapted to combine structure context information so as to be susceptible to content operations reflecting user parameters and context parameters defining a profile code.

It will be appreciated that a "service", as used herein, is an application program executable across multiple user sessions. A service may be available to one or more system components, programs, and/or other services. In some implementations, a service may run on one or more server-computing devices.

When included, display subsystem 611 may be used to present a visual representation of data held by storage device. This visual representation may take the form of a graphical user interface (GUI). As the herein described methods and processes change the data held by the storage device 602, and thus transform the state of the storage device 602, the state of display subsystem 611 may likewise be transformed to visually represent changes in the underlying data. Display subsystem 611 may include one or more display devices. Such display devices may be combined with logic device and/or storage device in a shared enclosure, or such display devices may be peripheral display devices.

When included, input subsystem may comprise or interface with one or more user-input devices such as a keyboard 612, mouse 613, touch screen 611, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 620 may be configured to communicatively couple computing system with one or more other computing devices. For example, communication module of may communicatively couple computing device to remote service hosted for example on a remote server 676 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 674, or a wired or wireless local- or wide-area network. In some embodiments, the communication subsystem may allow computing system to send and/or receive messages to and/or from other devices via a network such as the Internet 675. The communications subsystem may additionally support short range inductive communications 621 with passive devices (NFC, RFID etc).

The system of FIG. 6 is intended to reflect a broad range of different types of information handling system. It will be appreciated that many of the subsystems and features described with respect to FIG. 6 are not required for implementation of the invention, but are included to reflect possible systems in accordance with the present invention. It will be appreciated that system architectures vary widely, and the relationship between the different sub-systems of FIG. 6 is merely schematic, and is likely to vary in terms of layout and the distribution of roles in systems. It will be appreciated that, in practice, systems are likely to incorporate different subsets of the various features and subsystems described with respect to FIG. 6.

Figure 7:
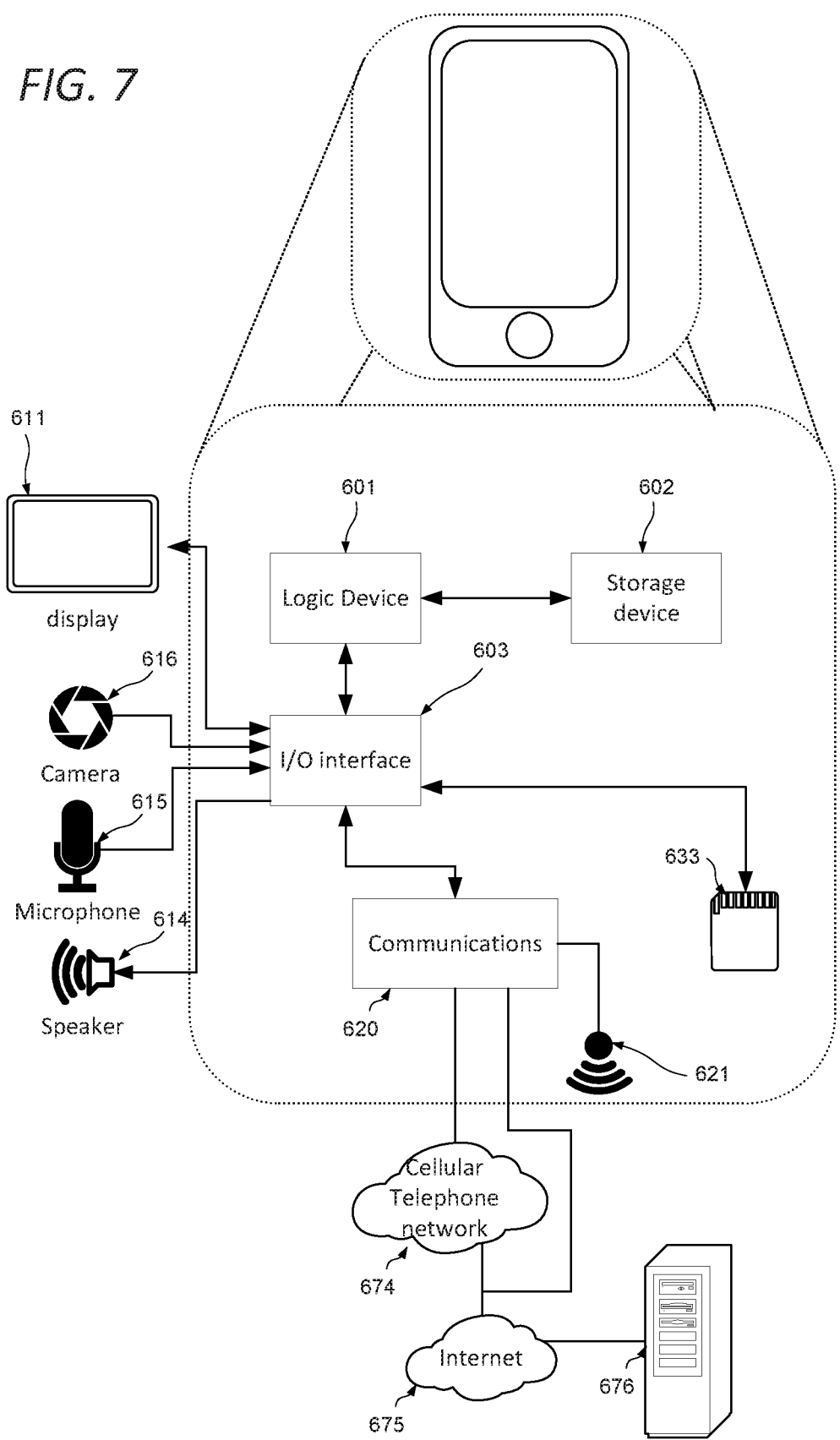
FIG. 7 shows a smartphone device adaptable to constitute an embodiment.

FIG. 7 shows a smartphone device adaptable to constitute an embodiment. As shown in FIG. 7, the smartphone device incorporates elements 601, 602, 603, 620, 633, 614, 615, 616, 611 as described above. It is potentially in communication with the telephone network 674 and a server 676 via the network 675. On the other hand, elements 631, 632, 617, 612, 613 may be omitted. It will be appreciated that the features disclosed in this figure may also be included within a tablet device, a dedicated hand held display unit and the like.

FIGS. 6 and 7 disclose certain example devices in accordance with the present invention. Those of ordinary skill in the art will appreciate that systems may be employed in the future which also operate in accordance with the present invention.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A profile code reading and processing device comprising at least a processor and at least a memory, wherein the at least a processor is configured to:
   read a first optically, magnetically, short range radio, acoustically or tactile machine readable said profile code encoded in an object local to a user, wherein said profile code defines a filter for use in the processing of content;
   create, from said reading of said profile code, a persistent record with a predefined lifetime in a database local to said user of said filter locally to said user, wherein expiry of the predefined lifetime is set to expire at a certain fixed amount of time from said reading of said profile code;
   read a second optically, magnetically, short range radio, acoustically or tactile machine readable content code encoded in an object local to said user wherein said content code incorporates output text;
   recover said filter from said persistent record;
   apply said filter to said output text to extract a portion of said text; output said extracted portion of said text to said user;
   at the expiry of said predefined lifetime, delete said profile code from said database local to said user; and
   wherein said profile code or said content code includes a threshold time, and wherein the at least a processor is further configured to proceed to said applying said filter for use in the processing of content if said threshold time is later than said current time.

2. A computer implemented method performed by a profile code reading and processing device comprising at least a processor and at least a memory, said method comprising:
   reading an optically, magnetically, short range radio, acoustically or tactile machine readable said profile code encoded in an object local to a user, wherein said profile code defines a filter for use in the processing of content;
   creating, from said reading of said profile code, a persistent record with a predefined lifetime in a database local to said user of said filter locally to said user, wherein expiry of the predefined lifetime is set to expire at a certain fixed amount of time from said reading of said profile code;
   reading an optically, magnetically, short range radio, acoustically or tactile machine readable content code encoded in an object local to said user wherein said content code incorporates output text;
   recovering said filter for use in the processing of content from said persistent record;
   applying said filter to said output text to extract a portion of said text; outputting said extracted portion of said text to said user;
   at the expiry of said predefined lifetime, deleting said profile code from said database local to said user; and
   wherein said profile code or said content code includes a threshold time, and wherein the at least a processor is further configured to proceed to said applying said filter for use in the processing of content if said threshold time is later than said current time.

3. The method of claim 2 wherein said reading said profile code or said reading said content code comprises scanning an optical code.

4. The method of claim 2 wherein said reading said profile code or said reading a content code comprises interrogating an RFID tag.

5. The method of claim 2 further comprising modifying the content of said persistent record after said recovering the content of said persistent record.

6. The method of claim 2 wherein said profile code or said content code includes a threshold time, and wherein said method proceeds to said applying said filter for use in the processing of content if said threshold time is later than the current time.

7. The method of claim 2 in which said profile code or said persistent record is encrypted.

8. A computer program product for a profile code reading and processing device, the computer program product comprising computing instructions stored on a non-transitory computer storage medium and when the computing instructions are executed by one or more processors, configure the one or more processors to:
   read a first optically, magnetically, short range radio, acoustically or tactile machine readable said profile code encoded in an object local to a user, wherein said profile code defines a filter for use in the processing of content;

create, from said reading of said profile code, a persistent record with a predefined lifetime in a database local to said user of said filter locally to said user, wherein expiry of the predefined lifetime is set to expire at a certain fixed amount of time from said reading of said profile code;

read a second optically, magnetically, short range radio, acoustically or tactile machine readable content code encoded in an object local to said user wherein said content code incorporates output text;

recover said filter from said persistent record;

apply said filter to said output text to extract a portion of said text;

output said extracted portion of said text to said user;

at the expiry of said predefined lifetime, delete said profile code from said database local to said user; and wherein said profile code or said content code includes a threshold time, and wherein when the computing instructions are executed by the one or more processors, the one or more processors is further configured to proceed to said applying said filter for use in the processing of content if said threshold time is later than said current time.

* * * * *